US009019339B2

United States Patent
Nicholson et al.

(10) Patent No.: US 9,019,339 B2
(45) Date of Patent: Apr. 28, 2015

(54) MULTIPARTY SERVICE ESTABLISHMENT BASED ON PRIORITY RULES FOR ROUTING

(71) Applicants: Mark A. Nicholson, Princeton, TX (US); Shawn Ferdinand, Allen, TX (US); Rachel Lee Scarbrough, Plano, TX (US)

(72) Inventors: Mark A. Nicholson, Princeton, TX (US); Shawn Ferdinand, Allen, TX (US); Rachel Lee Scarbrough, Plano, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 242 days.

(21) Appl. No.: 13/684,758

(22) Filed: Nov. 26, 2012

(65) Prior Publication Data

US 2014/0146126 A1    May 29, 2014

(51) Int. Cl.
*H04N 7/15*   (2006.01)
*H04L 12/18*  (2006.01)
*H04L 29/06*  (2006.01)

(52) U.S. Cl.
CPC ........ *H04L 12/1818* (2013.01); *H04L 65/1069* (2013.01); *H04N 7/15* (2013.01)

(58) Field of Classification Search
CPC ... H04L 12/1818; H04L 65/1069; H04N 7/15
USPC ............... 348/14.08, 14.09; 370/260, 261
See application file for complete search history.

(56) References Cited

U.S. PATENT DOCUMENTS

2012/0207151 A1*  8/2012  Alt et al. ............... 370/354
2012/0269195 A1* 10/2012  Adamczyk et al. ...... 370/389
2014/0071223 A1*  3/2014  Chatterjee et al. ...... 348/14.08

* cited by examiner

*Primary Examiner* — Stella Woo (57) ABSTRACT

Methods, devices, and storage media provide for receiving a request to use a multiparty service; applying priority rules for routing the request toward a destination endpoint, wherein the applying comprises determining whether the destination endpoint is a private destination endpoint or a public destination endpoint; routing the request toward the private destination endpoint in response to determining that a destination address or a portion thereof included in the request corresponds to the private destination endpoint; and routing the request toward the public destination endpoint in response to determining that the destination address or the portion thereof included in the request corresponds to the public destination endpoint.

20 Claims, 8 Drawing Sheets

MULTIPARTY SERVICE ESTABLISHMENT BASED ON PRIORITY RULES FOR ROUTING

BACKGROUND

A multiparty service, such as a conferencing service or a telepresence service, provides the service to multiple users that are located at multiple locations.

DETAILED DESCRIPTION

The following detailed description refers to the accompanying drawings. The same reference numbers in different drawings may identify the same or similar elements.

According to some service providers with deployed multiparty service architectures, the service is provided across multiple exchange platforms. By way of example and with reference to a telepresence service, each exchange platform provides video bridging and call processing services. When a multiparty service session (e.g., a telepresence session) is scheduled, the scheduling logic sets up the multiparty service session. Hosted customers' and partner carriers' architectures are configured to route initial service requests to a network device that is communicatively coupled to an exchange platform. These carrier-grade architectures may rely on Private Internet Protocol (PIP) and Multiprotocol Label Switching (MPLS) delivery systems.

With the recent expansion to service public domain customers via the Internet, multiparty service architectures may need to modify session establishment procedures.

The terms "destination," "destination address," and "destination string" are intended to be interpreted to include an entire destination address, a uniform resource identifier (URI), or the like, or a portion thereof.

According to an exemplary embodiment, a multiparty service architecture uses priority rules for routing to endpoints to establish a multiparty service session. According to an exemplary embodiment, the multiparty service architecture inspects a session establishment message (e.g., a Session Initiation Protocol (SIP) message, an H.323 message, etc) to identify the destination. Based on the identification of the destination, the multiparty service architecture determines whether the session establishment message is to be routed to a private endpoint or a public endpoint. According to an exemplary implementation, the multiparty service architecture compares a destination address to a database or a data structure that stores a list of destination addresses. Based on the comparison of a destination string included in the session establishment message with entries in the database or the data structure, the multiparty service architecture determines whether the session establishment message is to be routed to a private endpoint or a public endpoint. Depending on the outcome of the comparison, the multiparty service architecture routes the session establishment message toward the private endpoint or the public endpoint, as described herein.

According to an exemplary embodiment, the priority rules for routing provide that the multiparty service architecture determines whether the session establishment message is to be routed to a private endpoint before a determination is made whether the session establishment message is to be routed to a public endpoint.

According to an exemplary embodiment, the priority rules for determining whether the session establishment message is to be routed to a private endpoint provide that the multiparty service architecture determines whether the session establishment message is to be routed to or via a communication manager device. For example, the communication manager device provides proprietary signaling. If the multiparty service architecture determines that the session establishment message is not to be routed to or via the communication manager device, the multiparty service architecture determines whether the session establishment message is to be routed to a private endpoint that is not routed to or via the communication manager device.

According to an exemplary embodiment, if the multiparty service architecture determines that the session establishment message is not to be routed to a private endpoint, the multiparty service architecture determines whether the session establishment message is to be routed to a public endpoint. For example, the multiparty service architecture determines whether the public endpoint is hosted by the service provider associated with the multiparty service or the public endpoint is trunked to the multiparty service architecture. According to an exemplary embodiment, if the multiparty service architecture determines that the session establishment message is not to be routed to a public hosted endpoint nor a public trunked endpoint, the multiparty service architecture initiates or performs a domain name service (DNS) lookup to route the session establishment message via the Internet.

According to an exemplary embodiment, the multiparty service architecture includes a network device that establishes a session to private and public endpoints. For example, the multiparty service architecture includes a private call manager and a public call manager. According to an exemplary embodiment, the network device routes user requests to a multiparty service or a multiparty application (subsequently described as a multiparty service). According to an exemplary implementation, the multiparty service includes a conferencing service (e.g., a telephone conferencing service, a video conferencing service, a telepresence service). Alternatively, the multiparty service may include another type of service (e.g., a gaming service, etc.) that allows multiple users to participate in a service session at different locations.

While exemplary embodiments provided in this description may be implemented based on the use of a particular protocol, device, network architecture, platform, etc., such implementations are not intended to be restrictive or provide an exhaustive treatment, as such. In other words, the embodiments described herein may be implemented using other suitable protocols, devices, network architectures, platforms, etc., which may not be specifically described.

Figure 1:
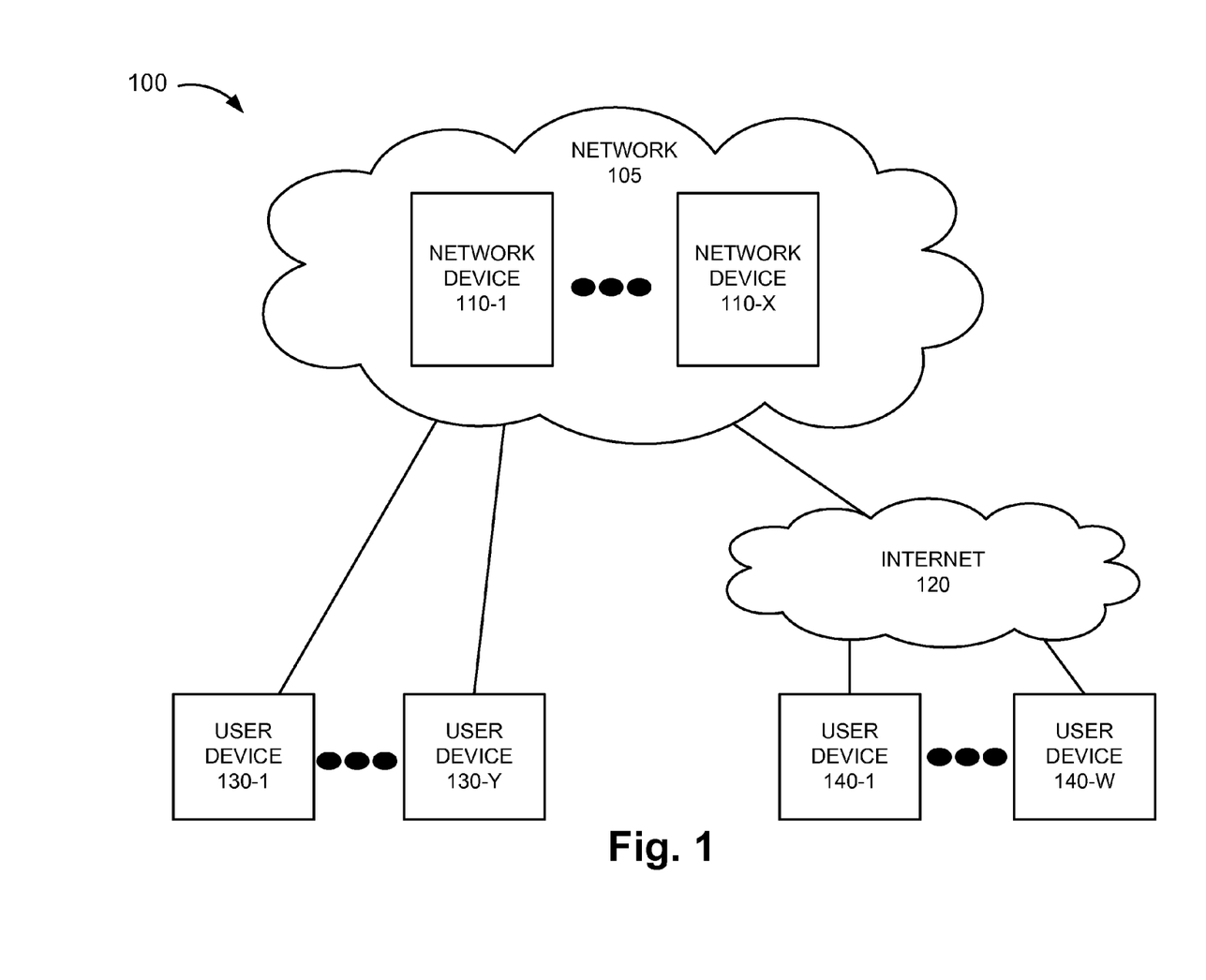
FIG. 1 is a diagram illustrating an exemplary environment in which an exemplary embodiment of a multiparty service may be implemented.

FIG. 1 is a diagram illustrating an exemplary environment in which an exemplary embodiment of a multiparty service may be implemented. As illustrated, environment 100 includes a network 105 that includes network devices 110-1 through 110-X (also referred to collectively as network devices 110 or individually as network device 110), the Internet 120, user devices 130-1 through 130-Y (also referred to collectively as user devices 130 or individually as user device 130), and user devices 140-1 through 140-W (also referred to collectively as user devices 140 or individually as user device 140).

The number of devices and the configuration in environment 100 are exemplary and provided for simplicity. According to other embodiments, environment 100 may include additional devices, fewer devices, different devices, and/or differently arranged devices, than those illustrated in FIG. 1. Additionally, the number of networks in environment 100 is exemplary and provided for simplicity.

According to other embodiments, a single device in FIG. 1 may be implemented as multiple devices and/or multiple devices may be implemented as a single device. For example, a portion of network devices 110 may be implemented as a single network device 110.

A device may be implemented according to one or multiple network architectures (e.g., a client device, a server device, a peer device, a proxy device, or some combination thereof). A device may be implemented according to a centralized computing architecture, a distributed computing architecture, or a cloud computing architecture.

Also, according to other embodiments, one or more functions and/or processes described as being performed by a particular device may be performed by a different device, or some combination of devices, which may or may not include the particular device.

Environment 100 may be implemented to include wired and/or wireless connections among the devices illustrated. A connection may be direct or indirect and involve intermediary device(s) and/or network(s) not illustrated in FIG. 1. The connections illustrated in FIG. 1 are exemplary.

Network 105 includes one or multiple networks of one or multiple types. For example, network 105 may include a local area network (LAN), a metropolitan area network (MAN), a wide area network (WAN), a packet-switched network, a private network, a wireless network, a wired network, a data network, or some combination thereof.

Network devices 110 include application devices, session border controller devices, and other types of network devices to provide the multiparty service. For example, the application devices may include telepresence video communication servers and a communications manager. The session border controller devices may include aggregation services routing functionality, and other network devices may provide communication management functionality, multipoint switching, load balancing, etc., pertaining to the multiparty service. Internet 120 corresponds to the public Internet. Network device(s) 110 use(s) the priority rules, as described herein, to provide a multiparty service.

User device 130 includes a device that allows a user to use the multiparty service. For example, with reference to a telepresence video conferencing service, user device 130 includes a display, a microphone, a speaker, a camera, and a user interface. User device 130 may be implemented as a mobile device or a stationary device. According to other multiparty services, user device 130 may be implemented as a computer, a game system, or other suitable device depending on the multiparty service. User device 140 includes a device similar to user device 130.

Referring to FIG. 1, according to an exemplary embodiment, user device 130 initiates a multiparty service session by transmitting a session establishment message to one of network devices 110. By way of example, the session establishment message may be implemented as a Session Initiation Protocol (SIP) message (e.g., a SIP Invite message) or an H.323 message (e.g., an H.323 Setup message). The session establishment message may use other protocols, such as, for example, Session Description Protocol (SDP), etc. Network device 110 receives the session establishment message and identifies a destination address included in the session establishment message. Network device 110 uses the priority rules for routing the session establishment message in view of the destination address.

According to an exemplary embodiment, network device 110 uses the priority rules and determines whether the session establishment message is to be routed to a private customer endpoint. For example, network device 110 compares the destination address included in the session establishment message with entries in a database or a data structure that store destination addresses. For example, the database or the data structure may store destination addresses that require proprietary signaling or identify a particular device (e.g., a communication manager device). Based on the comparison, network device 110 recognizes whether the session establishment message requires proprietary signaling or is to be routed to or via the particular device. Network device 110 transmits the session establishment message to another network device 110 (e.g., the communication manager device) when the destination address included in the session establishment message matches one of the destination addresses stored in the database or the data structure. The session establishment message is subsequently routed toward a private endpoint (e.g., user device 130), for example, along private route (e.g., a PIP route) with proprietary signaling.

According to an exemplary embodiment, network device 110 uses the priority rules and determines whether the session establishment message is destined to a private customer endpoint that does not require proprietary signaling or to be routed to or via a particular device. For example, network device 110 compares the destination address included in the session establishment message with entries in a database or a data structure that store destination addresses. For example, the database or the data structure may store destination addresses of private endpoints (e.g., customers of the multiparty service provider). Based on the comparison, network device 110 recognizes whether the session establishment message is destined to a private endpoint that does not require proprietary signaling or does not need to be routed to or via a particular device (e.g., a communication manager device). Network device 110 selects an appropriate network device 110 (e.g., a router, etc.) to which to transmit the session establishment message. The session establishment message is subsequently routed toward the private endpoint (e.g., user device 130), for example, along a private route (e.g., a PIP route, etc.).

According to an exemplary embodiment, network device 110 uses the priority rules to route a session establishment message via a public route. For example, if network device 110 determines that the session establishment message is not to be routed to a private endpoint, network device 110 recognizes that the session establishment message is to be routed to a public endpoint. For example, network device 110 compares the destination address included in the session establishment message with entries in a database or a data structure that store destination addresses that are public hosted endpoints (e.g., hosted by the service provider of the multiparty service). Based on the comparison, network device 110 recognizes whether the session establishment message is destined to a public hosted endpoint. Network device 110 transmits the session establishment message toward the public hosted endpoint when the destination address included in the session establishment message matches one of the destination addresses stored in the database or the data structure. The session establishment message is routed toward the public endpoint (e.g., user device 140), for example, along a public route (e.g., via Internet 120).

According to an exemplary embodiment, network device 110 uses the priority rules to route a session establishment message via a public route. For example, if network device 110 determines that the session establishment message is not to be routed to public hosted endpoint, network device 110 compares the destination address included in the session establishment message with entries in a database or a data structure that store destination addresses that are public trunked endpoints. Based on the comparison, network device 110 determines whether the session establishment message is destined to a public trunked endpoint. Network device 110 transmits the session establishment message toward the public trunked endpoint when the destination address included in the session establishment message matches one of the destination addresses stored in the database or the data structure. The session establishment message is routed toward the public endpoint (e.g., user device 140), for example, along a trunked route (e.g., via Internet 120).

According to an exemplary embodiment, network device 110 uses the priority rules and routes the session establishment message via a public route. For example, if network device 110 determines that the destination address of the session establishment message does not pertain to a public hosted endpoint or a public trunked endpoint, network device 110 initiates or performs a DNS lookup to route the session establishment message via Internet 120.

According to an exemplary embodiment, the multiparty service architecture uses the priority rules in a serial manner. For example, the multiparty service architecture first determines whether the session establishment message requires proprietary signaling or is to be routed to or via a particular device. If it is determined that the session establishment message does not require proprietary signaling or is not to be routed to or via the particular device, the multiparty service architecture determines whether the session establishment message is to be routed to a private endpoint that does not require proprietary signaling, etc.

According to an exemplary embodiment, the multiparty service architecture uses the priority rules in a parallel manner. For example, the multiparty service architecture compares the destination address included in the session establishment message to one or multiple databases or data structures to determine whether the endpoint is private, public, public hosted endpoint, etc.

Figure 2:
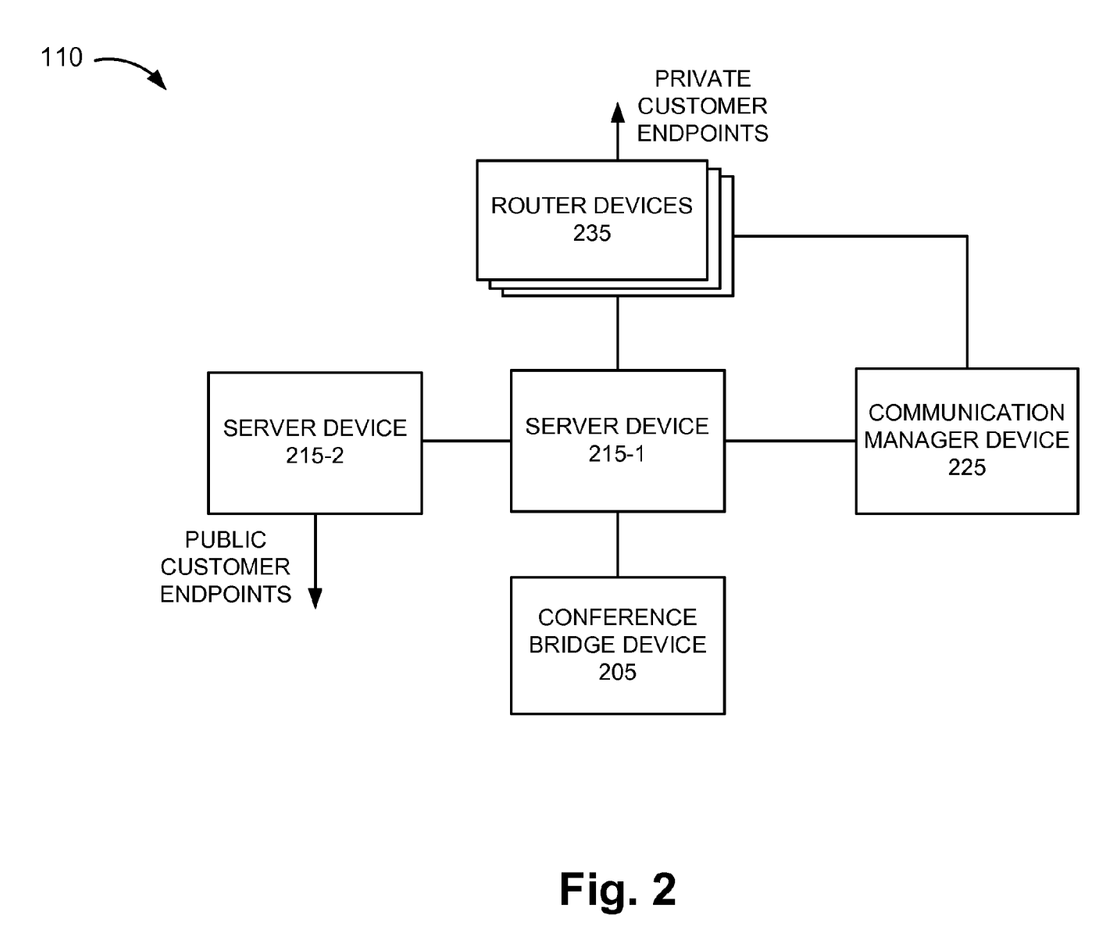
FIG. 2 is a diagram illustrating an exemplary implementation of the network devices depicted in FIG. 1.

FIG. 2 is a diagram illustrating an exemplary implementation of network devices 110. For example, network devices 110 include a conferencing bridge device 205, server devices 215-1 and 215-2 (also referred to collectively as server devices 215 or individually as server device 215), a communication manager device 225, and router devices 235. According to other implementations, network devices 110 may include additional devices, fewer devices, and/or different devices than those illustrated and described herein.

Conferencing bridge device 205 includes a network device that provides bridging services in the multiparty service architecture. For example, conferencing bridge device 205 may be implemented as a video conferencing bridge device or some other type of multipoint control unit suitable for providing a bridge for a multiparty service session.

Server device 215 includes a network device that provides routing based on the priority rules described herein. Server device 215 may be implemented as a video communication server or other suitable device depending on the multiparty service. By way of example, server device 215-1 may be implemented as a private video conferencing server device that uses the priority rules to route multiparty sessions to private customer endpoints, and server device 215-2 may be implemented as a public video conferencing server that uses the priority rules to route multiparty sessions to public customer endpoints.

Communication manager device 225 includes a network device that provides communication processing. For example, communication manager device 225 provides session management, voice, video, data, messaging, mobile applications, and web conferencing. Communication manager device 225 may be implemented as a unified communication manager device (e.g., a Cisco Unified Communications Manager (UCM)).

Router devices 235 include network devices that provide routing and edge services. For example, router devices 235 may be implemented as aggregation services routers (ASRs).

Figure 3A:
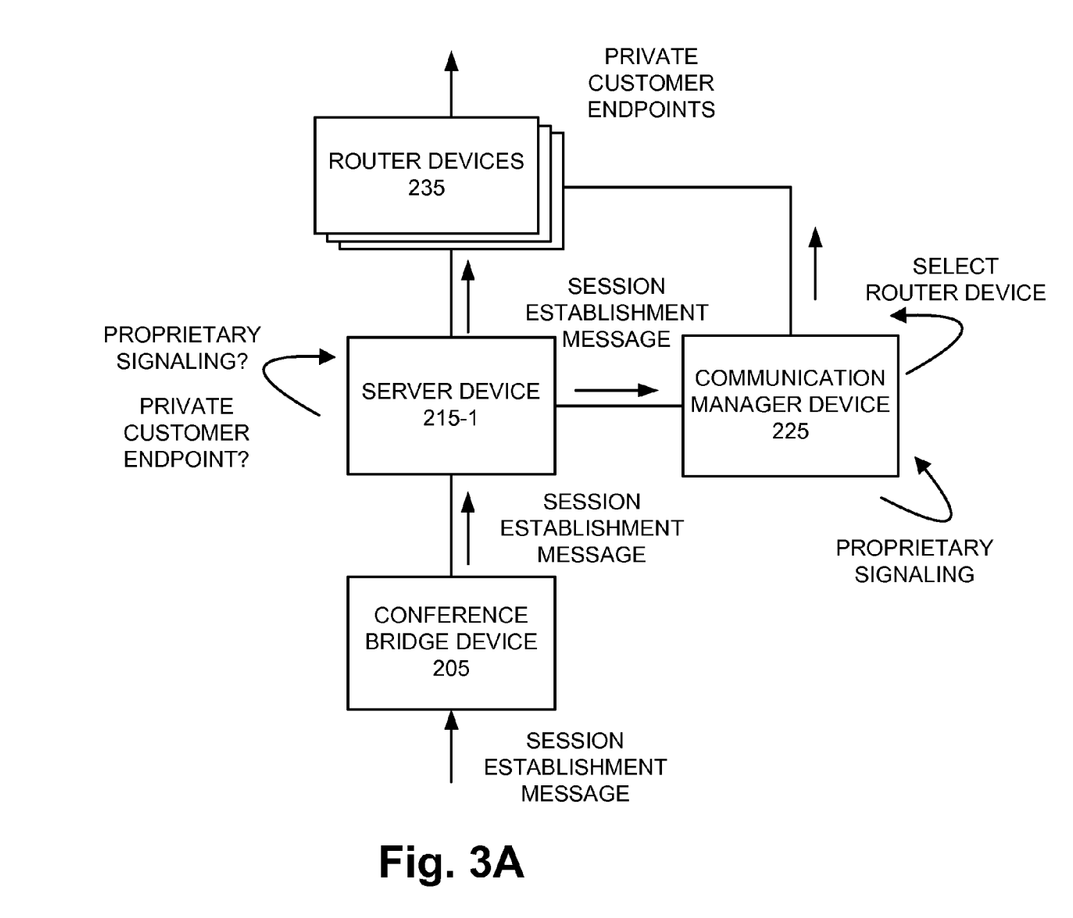
FIGS. 3A and 3B illustrate an exemplary process for delivering a multiparty service based on priority rules for routing.
Figure 3B:
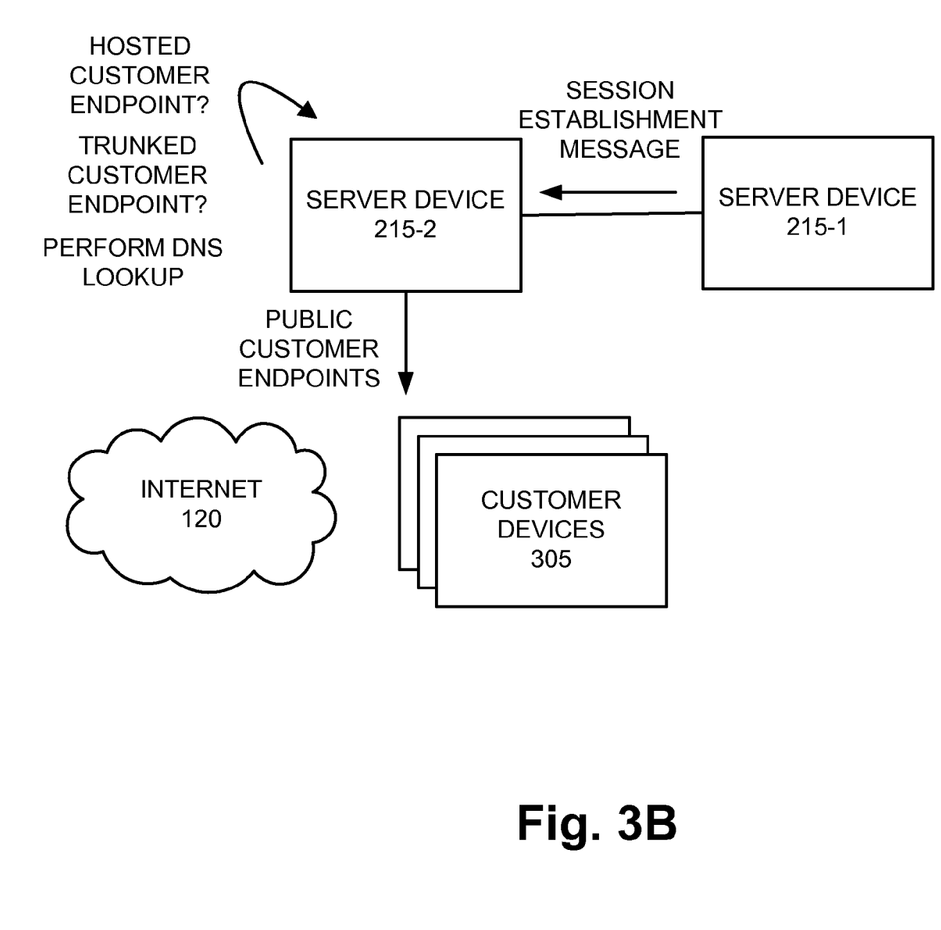

FIGS. 3A and 3B illustrate an exemplary process for delivering a multiparty service based on the priority rules for routing. Referring to FIG. 3A, according to an exemplary scenario, assume that a user initiates a service request, via user device 130 (not illustrated), to participate in a video conference. The service request is received by conferencing bridge device 205. Conferencing bridge device 205 transmits the session establishment message to server device 215-1. Server device 215-1 uses the priority rules for routing the session establishment message toward the destination, as described below.

Server device 215-1 receives the session establishment message and uses the priority rules for routing the session establishment message to an endpoint. According to an exemplary priority rule flow, server device 215-1 inspects the session establishment message and identifies a destination address in the session establishment message. Server device 215-1 compares the destination address to a database or a data structure that stores one or multiple strings corresponding to a destination address for communication manager device 225. For example, assume the session establishment message includes a destination address including a string "@CMD.com," which identifies communication manager device (CMD) 225. Server device 215-1 compares "@CMD.com" to one or multiple entries in the database or the data structure. In this example, assume there is a match and server device 215-1 forwards the session establishment message to communication manager device 225 based on the match.

Communication manager device 225 receives the session establishment message and processes the session establishment message. For example, communication manager device 225 provides, among other things, proprietary signaling via SIP or H.323. Communication manager device 225 selects one of router devices 235 to route the session establishment message to the appropriate endpoint (e.g., private customer endpoint).

Referring back to server device 215-1, assume that the session establishment message is not to be routed via communication manager device 225. According to an exemplary priority rule flow, in such a case, server device 215-1 determines whether the destination is a private customer endpoint. Server device 215-1 compares the destination address included in the session establishment message to a database or a data structure that stores strings corresponding to destination addresses that identify private customer endpoints. For example, assume the session establishment message includes a destination address including a string "@ABC.com," which identifies a private customer endpoint. Server device 215-1 compares "@ABC.com" to entries in the database or the data structure. In this example, assume there is a match and server device 215 forwards the session establishment message to one of router devices 235. One of router devices 235 receives the session establishment message and routes the session establishment message to the private customer endpoint via PIP.

Referring to FIG. 3B, assume that the session establishment message is not to be routed to a private customer endpoint. According to an exemplary priority rule flow, in such a case, server device 215-1 forwards the session establishment message to server device 215-2.

Server device 215-2 receives the session establishment message and uses the priority rules to route the session establishment message to a public endpoint. According to an exemplary priority rule flow, server device 215-2 inspects the session establishment message and identifies a destination address. Server device 215-2 compares the destination address to a database or a data structure that stores strings corresponding to destination addresses that identify public hosted endpoints. If there is a match, server device 215-2 forwards the session establishment message to the hosted public customer endpoint.

In the event that there is not a match, according to an exemplary priority rule flow, server device 215-2 determines whether the destination is a public endpoint in which a direct connection and/or a permanent connection exists. For example, a trunked connection may exist with one of customer devices 305 (e.g., one of customer premise equipment (CPE) call manager devices). Similar to that previously described, server device 215-2 compares the destination address included in the session establishment message to a database or a data structure that stores destination addresses that identify public trunked endpoints. If there is a match, server device 215-2 forwards the session establishment message to the appropriate customer device 305.

In the event that there is not a match, according to an exemplary priority rule flow, server device 215-2 initiates or performs a domain name system (DNS) lookup. Based on the result, server device 215-2 forwards the session establishment message to the public endpoint via Internet 120.

According to an exemplary embodiment, server device 215-2 may also forward a session establishment message via Internet 120 when server device 215-1 is unable to reach a private endpoint via, for example, PIP. Referring to FIG. 3A, according to an exemplary scenario, assume that a session establishment message is unable to reach a private customer endpoint due to congestion or some other type of failure (e.g., a device failure, a link failure, etc.). Server device 215-1 may receive an error message. In response, server device 215-1 forwards the session establishment message to server device 215-2. According to an exemplary implementation, server device 215-1 includes a flag, a bit, or the like in the session establishment message to indicate the unsuccessful attempt to reach the private endpoint. The flag or the bit may be inserted in an options field, an extension field, or the like. According to such an implementation, server device 215-2 recognizes the presence of the flag, the bit, or the like.

According to an exemplary implementation, server device 215-2 affords a priority to the session establishment message over other session establishment messages received. In this way, server device 215-2 may minimize latency. According to one implementation, server device 215-2 may use the priority rules to route the session establishment message, as previously described. According to another implementation, server device 215-2 may skip a priority rule and initiate a DNS lookup so as to forward the session establishment message via Internet 120.

According to yet another exemplary implementation, when server device 215-1 is unable to reach a private endpoint, server device 215-1 does not include a flag, a bit, or the like in the session establishment message. When the session establishment message is received by server device 215-2, server device 215-2 uses the priority rules to forward the session establishment message, as previously described.

Figure 4:
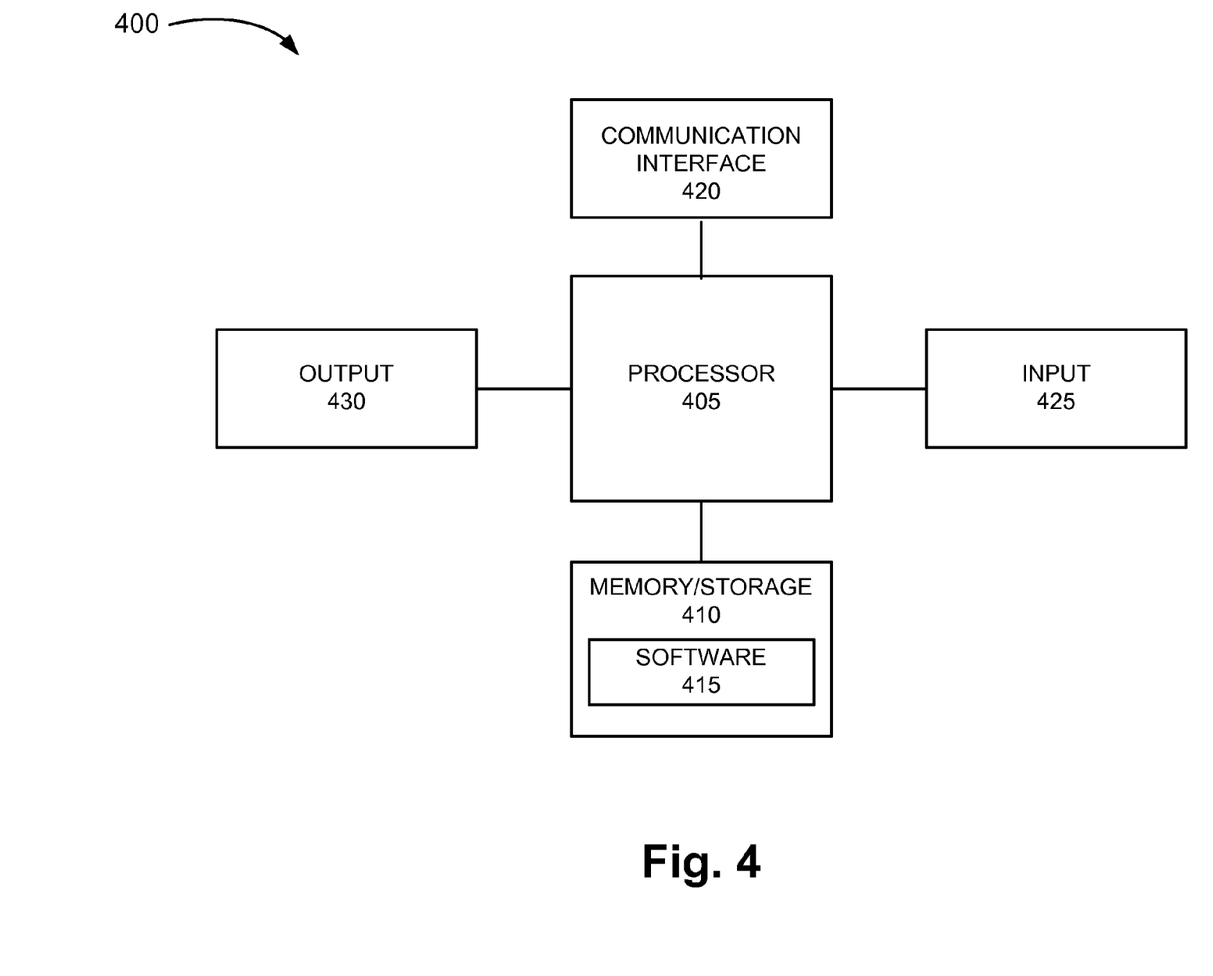
FIG. 4 is a diagram illustrating exemplary components of a device that may correspond to one or more of the devices in the environment depicted in FIG. 1.

FIG. 4 is a diagram illustrating exemplary components of a device 400 that may correspond to one or more of the devices depicted in the figures. As illustrated, according to an exemplary embodiment, device 400 includes a processor 405, memory/storage 410 that stores software 415, a communication interface 420, an input 425, and an output 430. According to other embodiments, device 400 may include fewer components, additional components, different components, and/or a different arrangement of components than those illustrated in FIG. 4 and described herein.

Processor 405 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (e.g., one or multiple cores), microcontrollers, and/or some other type of component that interprets and/or executes instructions. Processor 405 may be implemented as hardware (e.g., a microprocessor, etc.) or a combination of hardware and software (e.g., a SoC, an ASIC, etc.). Processor 405 may include one or multiple memories (e.g., memory/storage 410), etc.

Processor 405 may control the overall operation or a portion of operation(s) performed by device 400. Processor 405 may perform one or multiple operations based on an operating system and/or various applications or programs (e.g., software 415). Processor 405 may access instructions from memory/storage 410, from other components of device 400, and/or from a source external to device 400 (e.g., a network, another device, etc.).

Memory/storage 410 includes one or multiple memories and/or one or multiple other types of storage mediums. For example, memory/storage 410 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a phase-change memory (PCM), a dual in-line memory module (DIMM), a flash memory, and/or some other type of memory. Memory/storage 410 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 410 may include a drive for reading from and writing to the storage medium.

Memory/storage 410 may be external to and/or removable from device 400, such as, for example, a Universal Serial Bus (USB) memory stick, a dongle, a hard disk, mass storage, off-line storage, or some other type of storage medium (e.g., a compact disk (CD), a digital versatile disk (DVD), a Blu-Ray® disk (BD), etc.). Memory/storage 410 may store data, software, and/or instructions related to the operation of device 400.

Software 415 includes an application or a program that provides a function and/or a process. Software 415 may include firmware. For example, network device 110 (e.g., server devices 215) may include software 415 to perform routing based on the priority rules described herein. Additionally, for example, other devices may be implemented with software 415 to provide a function or a process, as described herein.

Communication interface 420 permits device 400 to communicate with other devices, networks, and/or systems. Communication interface 420 may include a wireless interface and/or a wired interface. Communication interface 420 includes a transmitter, a receiver, and/or a transceiver. Communication interface 420 may operate according to one or multiple protocols, standards, and/or the like.

Input 425 provides an input into device 400. For example, input 425 may include a keyboard, a mouse, a display, a touchscreen, a touchless screen, a button, a switch, an input port, speech recognition logic, and/or some other type of visual, auditory, tactile, etc., input component. Output 430 provides an output from device 400. For example, output 430 may include a speaker, a display, a touchscreen, a touchless screen, a light, an output port, and/or some other type of visual, auditory, tactile, etc., output component.

Device 400 may perform processes and/or functions, as described herein, in response to processor 405 executing software 415 stored by memory/storage 410. By way of example, the instructions may be read into memory/storage 410 from another memory/storage 410 or read into memory/storage 410 from another device via communication interface 420. The instructions stored by memory/storage 410 may cause processor 405 to perform one or more processes described herein. Alternatively, for example, according to other implementations, device 400 may perform one or more processes described herein based on fixed function hardware and/or other well-known architectures.

Figure 5A:
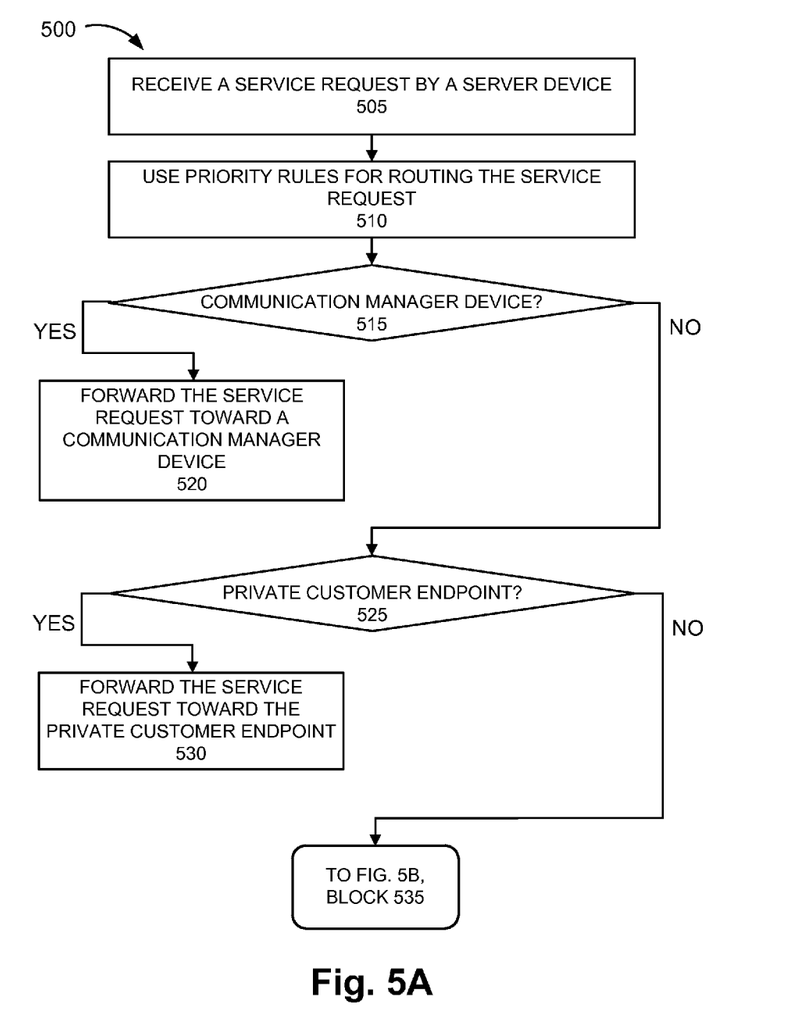
FIGS. 5A-5C are flow diagrams illustrating an exemplary process for providing a multiparty service based on priority rules for routing.
Figure 5B:
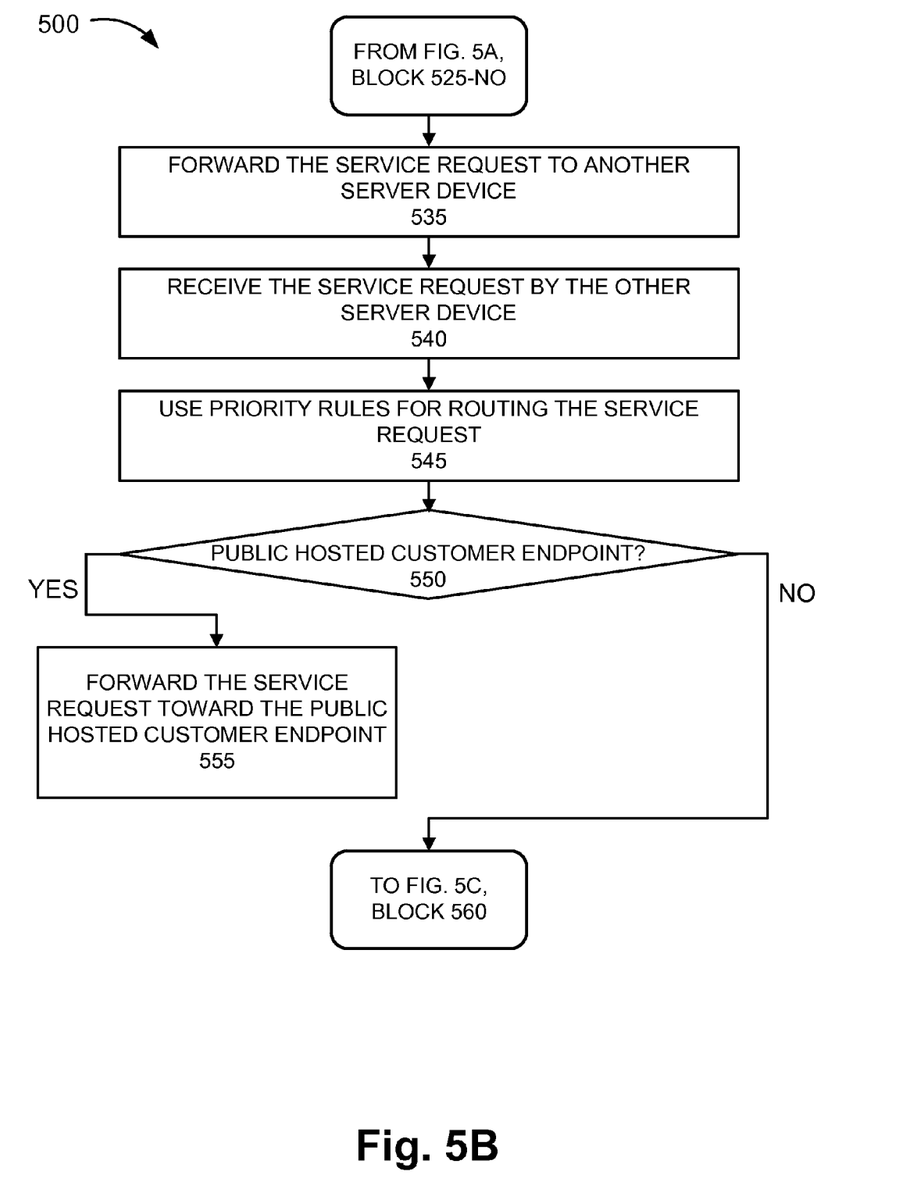
Figure 5C:
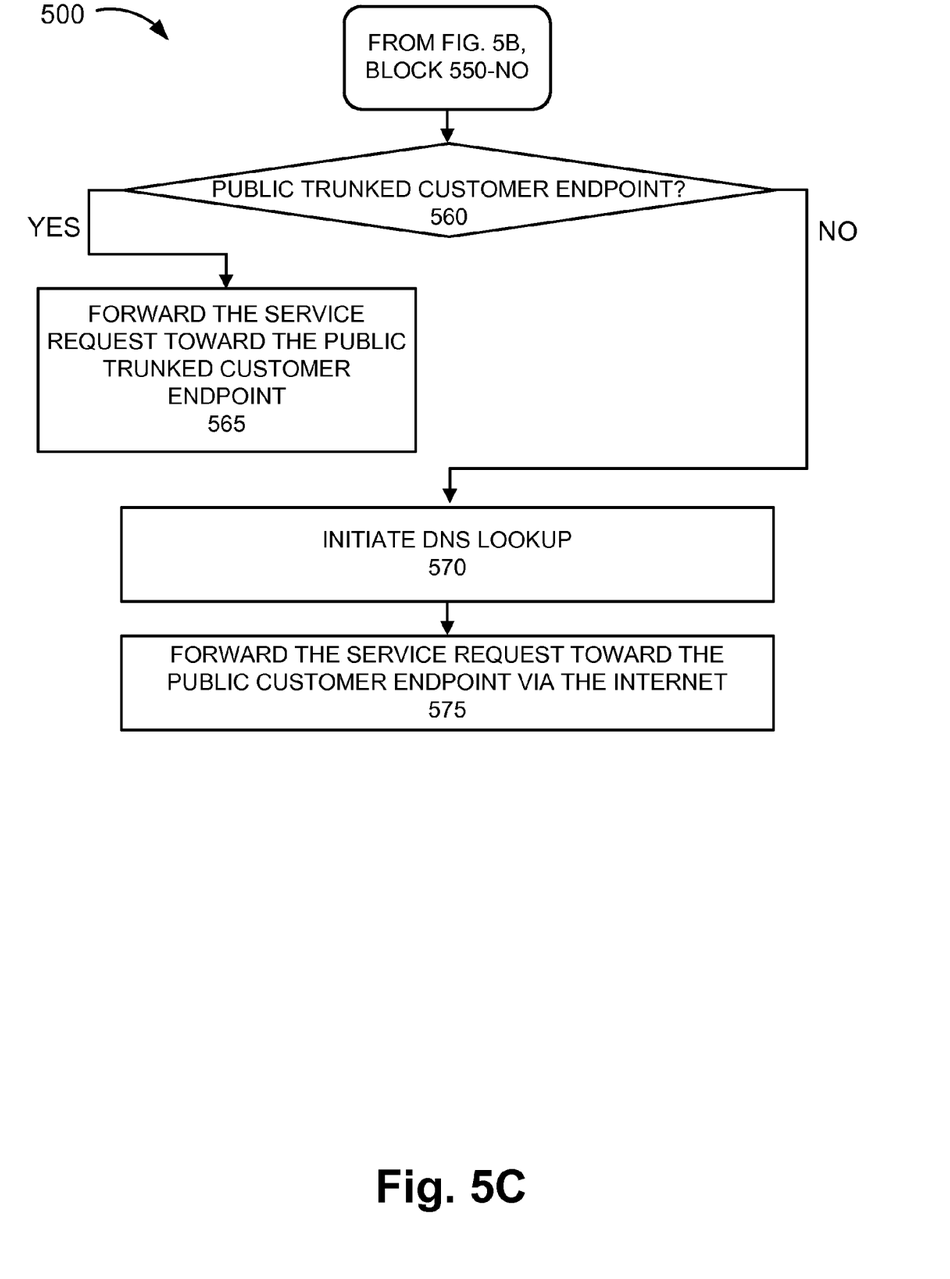

FIGS. 5A-5C are flow diagrams illustrating an exemplary process for providing a multiparty service based on the priority rules for routing. According to an exemplary embodiment, network devices 110 perform process 500. For example, processor 405 may execute software 415 to perform the steps described.

Referring to FIG. 5A, in block 505, a service request is received. For example, network device 110 (e.g., server device 215-1) receives a service request for a multiparty service from a user device (e.g., user device 130). According to an exemplary implementation, the service request includes a SIP Invite message or an H.323 setup message.

In block 510, the priority rules for routing the service request are used. For example, server device 215-1 uses the priority rules for routing the service request. According to an exemplary implementation, server device 215-1 stores a database or a data structure. The database or the data structure stores destination addresses that are used for comparison, as previously described.

In block 515, it is determined whether the service request is to be routed to a communication manager device. According to an exemplary implementation, server device 215-1 uses a priority rule that specifies to route service requests destined to private customer endpoints via a communication manager device (e.g., communication manager device 225). As previously described, server device 215-1 compares the destination address included in the service request to a database or a data structure that store(s) destination address(es) that identify the communication manager device.

If it is determined that the service request is to be routed to the communication manager device (block 515—YES), then the service request is forwarded toward the communication manager device (block 520). For example, server device 215-1 routes the service request toward communication manager device 225 when there is a match with the destination address included in the service request with an entry in the database or the data structure, as previously described. Communication manager device 225 may provide proprietary signaling with respect to the service request so as to route the service request toward a private customer endpoint.

If it is determined that the service request is not to be routed to the communication manager device (block 515—NO), then it is determined whether the service request is to be routed to a private customer endpoint (block 525). According to an exemplary implementation, server device 215-1 uses a priority rule that specifies to route service requests destined to private customer endpoints without traversing the communication manager device. As previously described, server device 215-1 compares the destination address included in the service request to a database or a data structure that stores destination addresses that identify private customer endpoints.

If it is determined that the service request is to be routed to a private customer endpoint (block 525—YES), then the service request is forwarded toward the private customer endpoint (block 530). For example, server device 215-1 routes the service request toward one of router devices 235 when there is a match with the destination address included in the service request with an entry in the database or the data structure, as previously described.

If it is determined that the service request is not to be routed to the private customer endpoint (block 525—NO), then the service request is forwarded to another server device (block 535), as illustrated in FIG. 5B. For example, server device 215-1 forwards the service request to server device 215-2. In block 540, the service request is received by the other server device. For example, server device 215-2 receives the service request from server device 215-1.

In block 545, the priority rules for routing the service request are used. For example, server device 215-2 uses the priority rules for routing the service request. According to an exemplary implementation, server device 215-2 stores a database or a data structure. The database or the data structure stores destination addresses that are used for comparison, as previously described.

In block 550, it is determined whether the service request is to be forwarded to a public hosted customer endpoint. According to an exemplary implementation, server device 215-2 uses a priority rule that specifies to route service requests destined to public hosted customer endpoints. As previously described, server device 215-2 compares the destination address included in the service request to a database or a data structure that stores destination addresses that identify public hosted customer endpoints.

If it is determined that the service request is to be routed to the public hosted customer endpoint (block 550—YES), then the service request is forwarded toward the public hosted customer endpoint (block 555). For example, server device 215-2 routes the service request toward the public hosted customer endpoint via Internet 120.

If it is determined that the service request is not to be routed to the public hosted customer endpoint (block 550—NO), then it is determined whether the service request is to be routed to a public trunked customer endpoint (block 560), as illustrated in FIG. 5C. According to an exemplary implementation, server device 215-2 uses a priority rule that specifies to route service requests destined to public trunked customer endpoints. As previously described, server device 215-2 compares the destination address included in the service request to a database or a data structure that stores destination addresses that identify public trunked customer endpoints.

If it is determined that the service request is to be routed to a public trunked customer endpoint (block 560—YES), then the service request is forwarded toward the public trunked customer endpoint (block 565). For example, server device 215-2 routes the service request toward the public trunked customer endpoint via Internet 120.

If it is determined that the service request is not routed to a public trunked customer endpoint (block 560—NO), then a DNS lookup is initiated (block 570). For example, server device 215-2 initiates a DNS lookup. Server device 215-2 receives a DNS response. In block 575, the service request is forwarded toward the public customer endpoint based on a result of the DNS lookup. For example, server device 215-2 routes the service request to the public endpoint via Internet 120 based on the DNS response.

Although FIGS. 5A-5C illustrate an exemplary process 500, according to other embodiments, process 500 may include additional operations, fewer operations, and/or different operations than those illustrated in FIGS. 5A-5C as described herein. For example, process 500 may include different operations when a service request is unable to reach a private customer endpoint, as previously described. Additionally, according to other embodiments, depending on the architecture of the multiparty service and/or the type of multiparty service, other devices may be used for routing. For example, in block 515, process 500 may determine whether the service request is to be routed to a device different from communication manager device 225.

The foregoing description of embodiments provides illustration, but is not intended to be exhaustive or to limit the embodiments to the precise form disclosed. Accordingly, modifications to the embodiments described herein may be possible.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

In addition, while a series of blocks has been described with regard to the process illustrated in FIGS. 5A-5C, the order of the blocks may be modified according to other embodiments. Further, non-dependent blocks may be performed in parallel. Additionally, other processes described in this description may be modified and/or non-dependent operations may be performed in parallel.

The embodiments described herein may be implemented in many different forms of software, firmware, and/or hardware. For example, a process or a function may be implemented as "logic" or as a "component." This logic or this component may include hardware (e.g., processor 405, etc.) or a combination of hardware and software (e.g., software 415). The embodiments have been described without reference to the specific software code since software can be designed to implement the embodiments based on the description herein.

Additionally, an embodiment described herein may be implemented as a non-transitory storage medium that stores data, information and/or instructions, such as a program, a data structure, a program module, an application, etc. For example, a non-transitory storage medium includes one or more of the storage mediums described in relation to memory/storage 410.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow.

The specification and drawings are accordingly to be regarded as illustrative rather than restrictive.

In the specification and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

No element, act, or instruction described in the present application should be construed as critical or essential to the embodiments described herein unless explicitly described as such.

What is claimed is:

1. A method comprising:
   receiving, by a device, a request to use a multiparty service;
   applying, by the device, priority rules for routing the request toward a destination endpoint, wherein the applying comprises:
   determining, by the device, whether the destination endpoint is a private destination endpoint or a public destination endpoint, wherein the determining comprises:
      storing a destination string that identifies a communication manager device; and
      comparing a destination address or a portion thereof to the destination string;
   routing, by the device, the request toward the private destination endpoint via the communication manager device in response to identifying a match between the destination string and the destination address or the portion thereof based on the comparing, and determining that the destination address or the portion thereof included in the request corresponds to the private destination endpoint; and
   routing, by the device, the request toward the public destination endpoint in response to determining that the destination address or the portion thereof included in the request corresponds to the public destination endpoint.

2. The method of claim 1, wherein the multiparty service includes one of a video conferencing service or a telepresence service, and the request includes a Session Initiation Protocol Invite message or an H.323 setup message.

3. The method of claim 1, wherein the priority rules indicate that the routing of the request toward the private destination endpoint has a priority over the routing of the request toward the public destination endpoint.

4. The method of claim 1, further comprising:
   routing, by the communication manager device, the request along a private route with proprietary signaling toward the private destination endpoint.

5. The method of claim 1, wherein the determining comprises:
   storing destination strings that identify private customer endpoints;
   comparing the destination address or the portion thereof to the destination strings; and wherein the routing toward the private destination endpoint comprises:
   routing the request toward one of the private customer endpoints, without traversing the communication manager device, in response to identifying a match between one of the destination strings and the destination address or the portion thereof based on the comparing.

6. The method of claim 5, further comprising:
storing destination strings that identify public hosted customer endpoints;
comparing the destination address or the portion thereof to the destination strings that identify public hosted customer endpoints; and wherein the routing toward the public destination endpoint comprises:
routing the request toward one of the public hosted customer endpoints, in response to identifying a match between one of the destination strings that identify a public hosted customer endpoint and the destination address or the portion thereof based on the comparing.

7. The method of claim 6, further comprising:
storing destination strings that identify public trunked customer endpoints;
comparing the destination address or the portion thereof to the destination strings that identify public trunked customer endpoints; and wherein the routing toward the public destination endpoint comprises:
routing the request toward one of the public trunked customer endpoints, in response to identifying a match between one of the destination strings that identify a public trunked customer endpoint and the destination address or the portion thereof based on the comparing.

8. The method of claim 7, further comprising:
initiating a domain name service lookup in response to determining that the destination address or the portion thereof does not identify a public hosted customer endpoint and a public trunked customer endpoint;
receiving a domain name service response; and
routing the request via the Internet and toward a public endpoint, in response to receiving the domain name service response.

9. A device comprising:
a transceiver;
a memory to store destination strings that identify public hosted customer endpoints;
a memory, wherein the memory stores instructions; and
a processor, wherein the processor executes the instructions to:
  receive, via the transceiver, a request to use a multiparty service;
  apply priority rules for routing the request toward a destination endpoint, wherein an application of the priority rules comprises:
  determine whether the destination endpoint is a private destination endpoint or a public destination endpoint;
  route, via the transceiver, the request toward the private destination endpoint in response to a determination that a destination address or a portion thereof included in the request corresponds to the private destination endpoint; and
  route, via the transceiver, the request toward the public destination endpoint in response to a determination that the destination address or the portion thereof included in the request corresponds to the public destination endpoint, wherein the determination to route the request toward the public destination endpoint is made when the processor executes the instruction to:
compare the destination address or the portion thereof to the destination strings; and;
route, via the transceiver, the request toward one of the public hosted customer endpoints, in response to an identification that a match exists between one of the destination strings and the destination address or the portion thereof.

10. The device of claim 9, further comprising:
a memory to store a destination string that identifies a communication manager device, wherein the processor executes the instructions to:
compare the destination address or the portion thereof to the destination string;
and wherein when routing toward the private destination endpoint, wherein when routing, the processor executes the instructions to:
route, via the transceiver, the request toward the private customer endpoint via the communication manager device in response to an identification that a match exists between the destination string and the destination address or the portion thereof.

11. The device of claim 9, further comprising:
a memory to store destination strings that identify private customer endpoints, wherein the processor executes the instructions to:
compare the destination address or the portion thereof to the destination strings; and wherein when routing toward the private destination endpoint, the processor executes the instructions to:
route, via the transceiver, the request toward the private customer endpoint, without traversing a communication manager device, in response to an identification that a match exists between the destination string and the destination address or the portion thereof.

12. The device of claim 9, wherein the processor executes the instructions to:
receive, via the transceiver, an error message that indicates that the request did not reach the private destination point;
insert data into the request that indicates an error based on the error message;
route, via the transceiver, the request to the private destination point via a public route.

13. The device of claim 9, further comprising:
a memory to store destination strings that identify public trunked customer endpoints, wherein the processor executes the instructions to:
compare the destination address or the portion thereof to the destination strings; and wherein when routing toward the public destination endpoint, the processor executes the instructions to:
route, via the transceiver, the request toward one of the public trunked customer endpoints, in response to an identification that a match exists between one of the destination strings and the destination address or the portion thereof.

14. The device of claim 9, wherein the processor executes the instructions to:
initiate a domain name service lookup in response to a determination that the destination address or the portion thereof does not identify a public hosted customer endpoint and a public trunked customer endpoint;
receive, via the transceiver, a domain name service response; and
route, via the transceiver, the request via the Internet and toward a public endpoint, in response to receipt of the domain name service response.

15. The device of claim 9, wherein the processor executes the instructions to:
route, via the transceiver, the request via the Internet, in response to a determination that the destination endpoint is the private destination endpoint and a previous attempt to reach the destination endpoint, via a private routing path, was unsuccessful.

16. The device of claim 9, wherein the device includes a video communication server.

17. A non-transitory storage medium that stores executable instructions, by a computational device, to:
receive a request to use a multiparty service;
apply priority rules for routing the request toward a destination endpoint, wherein an application of the priority rules comprises:
determine whether the destination endpoint is a private destination endpoint or a public destination endpoint, wherein the executable instructions to determine comprise executable instructions to compare a destination address or a portion thereof included in the request to destination strings that identify private customer endpoints;
route the request toward the private destination endpoint in response to an identification that a match exists between one of the destination strings and the destination address or the portion thereof, and a determination that the destination address or the portion thereof included in the request corresponds to the private destination endpoint; and
route the request toward the public destination endpoint in response to a determination that the destination address or the portion thereof included in the request corresponds to the public destination endpoint.

18. The non-transitory storage medium of claim 17, further storing executable instructions to:
compare the destination address or the portion thereof to a destination string that identifies a communication manager device; and wherein when routing toward the private destination endpoint, the executable instructions comprise instructions to:
route the request toward the private customer endpoint via the communication manager device in response to an identification that a match exists between the destination string and the destination address or the portion thereof.

19. The non-transitory storage medium of claim 17, further storing executable instructions to:
receive an error message that indicates that the request did not reach the private destination point;
insert data into the request that indicates an error based on the error message;
route the request to the private destination point via a public route.

20. The non-transitory storage medium of claim 17, further storing executable instructions to:
compare the destination address or the portion thereof to destination strings that identify public customer endpoints; and wherein when routing toward the public destination endpoint, the executable instructions comprise instructions to:
route the request toward the public customer endpoint in response to an identification that a match exists between one of the destination strings and the destination address or the portion thereof, wherein the public customer endpoints include public hosted customer endpoints and public trunked customer endpoints.

* * * * *